Sept. 7, 1965  MELVIN CHEN-SIANG CHANG  3,205,064
NEUTRALIZATION OF WASTE PICKLE LIQUOR WITH BLAST FURNACE DUST
Filed June 11, 1963

INVENTOR.
MELVIN C. CHANG
BY John R. Pegan
ATTORNEY

United States Patent Office 3,205,064
Patented Sept. 7, 1965

3,205,064
NEUTRALIZATION OF WASTE PICKLE LIQUOR WITH BLAST FURNACE DUST
Melvin Chen-Siang Chang, Youngstown, Ohio, assignor to Crucible Steel Company of America, Pittsburgh, Pa., a corporation of New Jersey
Filed June 11, 1963, Ser. No. 288,855
1 Claim. (Cl. 75—5)

This application is a continuation-in-part of my co-pending application Serial No. 72,954, filed December 1, 1960, now abandoned.

This invention relates generally to the efficient operation of integrated facilities for the manufacture of iron and steel and, more particularly, to the disposition, economically and in compliance with stream-pollution regulations, of pickle waste incidental to such manufacture.

Initially the problem of disposing of pickle waste was solved by simply relegating such waste, untreated, to nearby rivers and streams. However, with increasing population growth and concomitant community interest in stream pollution, the laws regulating and prohibiting such practice have become more stringent, and presently, the legal acceptability of this practice anywhere in this country is seriously in question.

With the practice of dispensing untreated pickle waste to natural watercourses precluded, iron and steel manufacturers have turned to other practices for a solution to their problem. One such practice that has been considered is the treatment of pickle waste to effectively neutralize it and thus nullify any legal objection concerning its introduction to streams and rivers.

The prior art is replete with processes of this general nature for solving the instant problem, but for one reason or another such processes have not always proven satisfactory. Among the more promising of these processes has been the process of neutralizing waste pickle liquor with blast-furnace dust.

In the operation of one such process, blast-furnace flue dust is subjected to a wet scrubber and Cottrell precipitator, and the combined flows of dust-laden water, which is at a rate of thousands of gallons per minute, plus dry dust optionally, are introduced to a mixing tank. Waste sulfate pickle liquor is added slowly, and the resultant mixture is aerated to remove carbon dioxide and partially oxidize precipitable hydrates. The liquor then flows to a precipitating tank where high-calcium lime is added and the mixture is further aerated to oxidize ferrous ions to the ferric state. The resulting slurry, comprising a calcium sulfate solution containing precipitated iron hydrates, iron oxidates, lime compounds and coke dust, is sent to a thickener, and settled sludge therefrom is dewatered on a vacuum filter. The filter cake is processed in a sinter plant to recover iron oxide, and the filtrate is disposed of in nearby streams and rivers. Exemplary of such a process is Cooper U.S. Patent No. 2,810,633. In the operation of this process, it is important to note that calcium sulfate is not precipitated, and it is specifically arranged that the solubility product of calcium sulfate is not exceeded on account of the large volume of water present. It is, therefore, obvious that the aforementioned filtrate contains, as calcium sulfate, substantially all of the sulfate present in the original pickle liquor, and that a distinct disadvantage of this process is that it more than likely runs afoul of state stream-pollution laws. Although this process prevents stream pollution by ferrous iron, it has no effect upon stream pollution by calcium sulfate which is at least equally objectionable. Calcium sulfate causes high hardness (which interferes with domestic use), and leads to scale formation in power generation and other steam boilers. Another disadvantage of this process is the extremely large (and hence costly) vessels and agitators required in the neutralization step, as well as the increased operational and power costs. This stems from the treatment of the total flows coming into the thickener rather than only a portion of said flows, i.e., the underflows.

In an effort to obviate the foregoing disadvantages while at the same time retaining the advantages of (1) using equipment which for the most part is readily available in steel plants, (2) using a very economical neutralizing agent, and (3) recovering a by-product suitable for blast furnace feed, an investigation was undertaken, as a result of which the present invention was conceived.

Accordingly, a primary object of the invention is to provide a process for economically neutralizing waste pickle liquor.

Another object of the invention is to provide a process for treating waste pickle liquor by utilizing blast-furnace dust as a neutralizing agent.

A further object of the invention is to provide a process for neutralizing waste pickle liquor by utilizing blast-furnace dust and lime as neutralizing agents.

A still further object of the invention is to provide a process for treating waste pickle liquor wherein the harmful effect thereof when introduced to natural watercourses is substantially lessened.

Other objects and advantages of the invention will be apparent to one skilled in the art from the appended drawings and following description.

Figure 1:
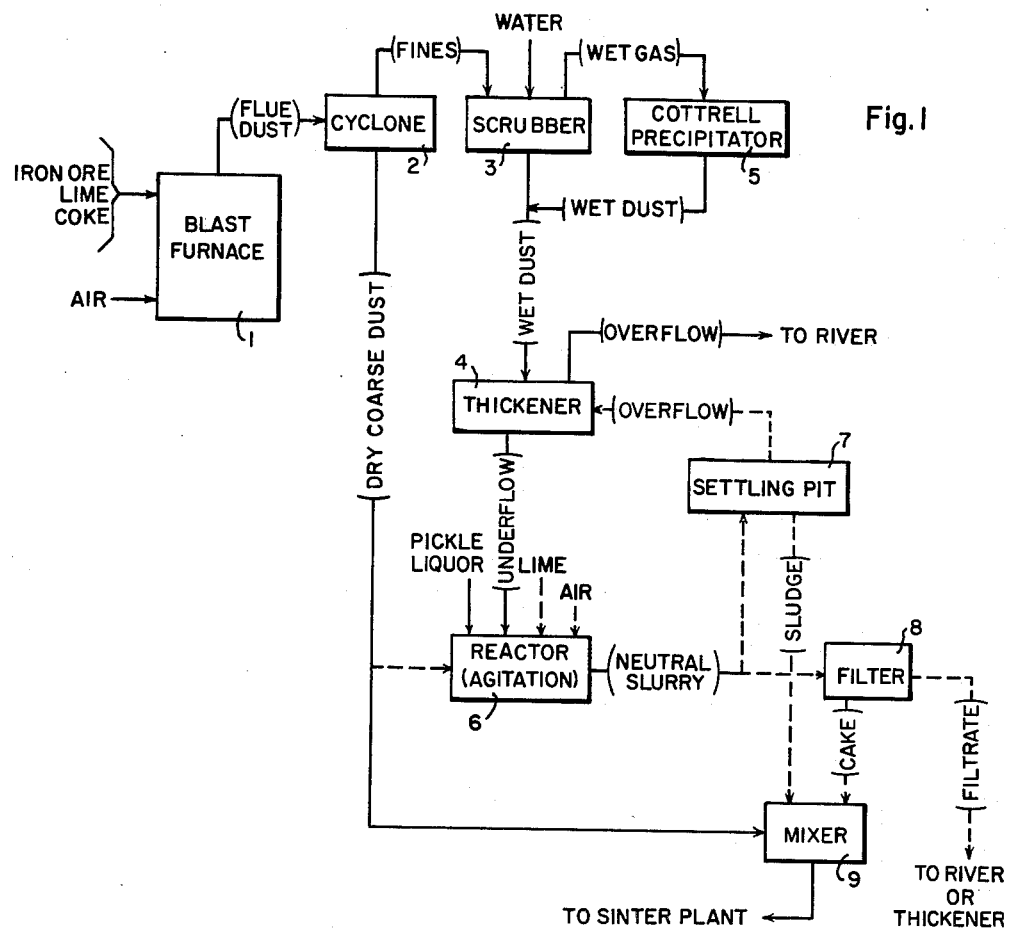
FIG. 1 is a schematic flow sheet of the process of the invention.

As is shown in FIG. 1, flue dust from a blast furnace 1 is directed to a cyclone 2, wherein it is classified into fines and dry coarse dust. The fines are led to a scrubber 3, where they are sprayed with water. The resultant slurry of wet dust is sent to a thickener 4, e.g., one of the Dorr type. To remove the last traces of solids from the gas, any wet dust that may be entrained in the wet gas issuing from scrubber 3 is preferably removed by electrostatic precipitation in a Cottrell precipitator 5 and combined with the wet dust entering the thickener 4 directly from scrubber 3. The overflow from thickener 4, which comprises about 99% of the inlet water, is substantially free from suspended solids and may be disposed of without legal objection as desired, for example, by leading it, directly or (if desired) ultimately after use for such incidental intermediate purpose as cooling, into a river or other nearby natural water course. The underflow from thickener 4 is led to reactor 6, where it is mixed with incoming waste pickle liquor. Preferably a gas containing molecular oxygen, e.g., air, is introduced to reactor 6 for the purpose of oxidizing to the ferric state about 2 to 5% of the ferrous ions in the contained mixture. The pure ferrous hydroxide is white, voluminous, viscous, and gelatinous. With only a trace of oxygen present, it turns black, and with further small increments of oxidation, its amenability to filtration improves, up to a point at which the oxidation, ferrous to ferric, is about 2 to 5% complete, at which point a reddish coloration begins to develop in the precipitate, and the filterability reaches a virtual optimum, such that it is not substantially further improved with further oxidation. Lime in the original flue dust is hydrated by the water in scrubber 3. The hydrated lime and the limestone present in the underflow from thickener 4 react with the free sulfuric acid and ferrous sulfate of the waste pickle liquor to yield calcium sulfate and ferrous hydroxide. The neutralizing power of the dust, both wet and dry, resides largely in its contained calcium compounds, with the free lime in the dry dust and the hydrated lime in the wet dust being more effective than the calcium carbonate contained in both the wet and the dry dust. Furthermore, some neutralizing value is believed to be derived from oxides in the dust, e.g., those of manganese and magnesium. Any iron oxide in the dust solubilized by reaction with sulfuric and in pickle liquor is not acting as a neutralization agent, because other base must subsequently be added to precipitate the iron dissolved from the dust. For simplicity, however, the neutralizing power of the dust will hereinafter be expressed in terms of the lime content. Complete neutralization is indicated by a pH value in the range of 6 to 8. Where the neutralizing power of the underflow from thickener 4 is insufficient, lime or such lime containing material as dolomite, may be used to augment this power and may be introduced to reactor 6 in such quantity as is found necessary to effect complete neutralization. Optionally, the neutralizing power of the dry coarse dust from cyclone 2 may be availed of by introducing same to reactor 6. Weight-for-weight the dry dust is not so reactive as the wet dust, and therefore its neutralizing power is not as great. This fact may be deduced from an examination of the data in Table I.

*Table 1*

| Run No. [a] | CaO in solids (percent) | Wet dust slurry, solids (percent) | Proportion of Lime from— | | | Total excess CaO (percent) [c] | Time (min.) | Final filtrate (pH) | Cake moisture (percent) |
|---|---|---|---|---|---|---|---|---|---|
| | | | Wet dust (percent) | Dry dust (percent) | Chemical Ca(OH)$_2$ [b] (percent) | | | | |
| 1 | 2.38 | 47.8 | 100 | | | 2 | 15 | 8.3 | 26.7 |
| 2 | 2.62 | 47.8 | | 100 | | 33 | 70 | 5.3 | |
| 3 | 2.36 | 40.0 | 29.3 | 47.3 | 23.4 | 25 | 30 | 6.1 | 20.2 |
| 4 | 2.38 | 47.8 | 25.4 | | 74.6 | 8 | 18 | 7.5 | 38.3 |

[a] The synthetic solution neutralized consisted of 26.8 g/l H$_2$SO$_4$ and 172 g/l FeSO$_4$. All runs were made at 140° F.
[b] Chemical grade Ca(OH)$_2$ was added as a 40% slurry.
[c] Lime added in excess of the stoichiometric amount required for neutralization of the synthetic pickle liquor.

It will be seen from the results set forth above in Table I that the neutralizing power of wet dust is greater than that of dry dust. For example, 100% wet dust having only 2% CaO in excess of stoichiometric requirements to effect neutralization of the synthetic pickle liquor required only 15 minutes to raise the pH to a value of 8.3. On the other hand, 100% dry dust having as much as 33% CaO in excess of stoichiometric requirements required as much as 70 minutes to raise the pH to a value of only 5.3, representing incomplete neutralization.

In addition to augmenting the neutralizing power of the wet dust, the dry dust serves another desirable function. Neutral slurry leaving reactor 6 must be freed of its solid matter, and in this connection the dry coarse dust reduces the percentage moisture thereof when the slurry is subjected to mechanical separation.

Fluid-solid separation, e.g., decantation, centrifugation, evaporation or filtration, may be accomplished by any of the known separatory devices employed for such unit operation. Preferably, however, a settling pit and/or a suitable filter, such as a rotary vacuum filter, may be employed. FIG. 1 shows the flow scheme with respect to the alternative employment of these devices. With respect to the former device, neutral slurry flows from reactor 6 to settling pit 7. The overflow from settling pit 7 contains varying amounts of solids; and hence, it is recycled to thickener 4 for more efficient separation. The sludge from settling pit 7 is sent to a mixer 9, where it is mixed with dry coarse dust from cyclone 2 and optionally other materials, e.g., mill scale, to provide feed for the sinter plant. With respect to the latter device, neutral slurry flows from reactor 6 to filter 8, the filtrate therefrom passing ordinarily to the river or other disposal. Where, however, the filtrate is unclear, as would be the case if a new filter is being put into operation or if a hole develops in the filter cloth, then the filtrate is recycled to thickener 4. The cake from filter 8, as in the case of the sludge from settling pit 7, is mixed with dry dust from cyclone 2 in mixer 9 and sent to the sinter plant. There, mixed with mill scale and possibly iron-ore fines, fuel such as anthracite fines or coke breeze if needed, moisture if desired, and possibly flux, the filter cake forms a sinter mix, which may then be sintered in accordance with known iron-ore-beneficiation sintering procedures, using for example a machine of the conventional Dwight-Lloyd traveling-grate type.

Inasmuch as the sulfate in the pickle liquor forms calcium sulfate which is precipitated into this cake or sludge, and inasmuch as introduction of sulfur in any form into the blast furnace is undesirable, it is fortunate that in the sintering process, a combination of heat and reducing agent decomposes the calcium sulfate, leaving a basic, low-sulfur residue in the sinter.

Figure 2:
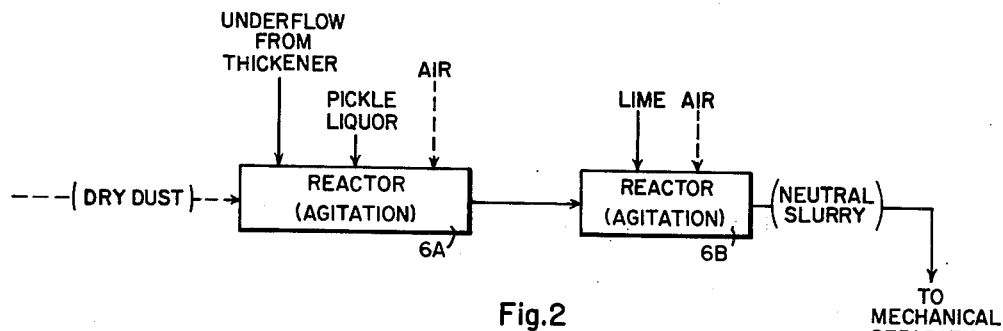
FIG. 2 shows a modification of the neutralization step of FIG. 1.

While FIG. 1 depicts a single-stage neutralization procedure, the invention is not restricted thereto, since within the broad concept of the invention, neutralization may be carried out in a plurality of stages. Exemplary thereof, FIG. 2 shows a specific embodiment of a two-stage neutralization procedure. It can be seen therein that underflow from the thickener is agitated in a first reactor 6A with waste pickle liquor. Optionally, for reasons stated heretofore, dry dust and/or air may be introduced therein. Partially neutralied slurry from the first reactor 6A flows to a second reactor 6B, where lime and optionally air are introduced and the entire mixture is agitated. Neutral slurry from the second reactor 6B is then handled in the same manner as neutral slurry from reactor 6 of FIG. 1.

Conditions in the reactor or reactors should be controlled to neutralize the pickle liquor and precipitate calcium sulfate and iron hydroxide with reasonable economy. In this connection, it has been found that while the necessary reactions taking place in the reactors are best effected at a temperature within the range of 100° to 160° F. and for a period of time within the range of 5 to 20 or 30 minutes, more broadly, temperatures in the range 40 to 212° F. and times of up to 6 hours may conceivably be used. Times greater than 20 minutes may be required to permit aeration, and consequent oxidation of ferrous iron, to occur to the extent desired. Optimum conditions take into account the characteristics of the flue dust and can best be determined by routine experimentation.

In the course of the investigation leading to the present invention, a test run of one embodiment of the inventive process was performed. Waste pickle liquor containing 2.2% H$_2$SO$_4$ and 14.1% FeSO$_4$, thickener underflow containing 45% solids, and hydrated lime containing 20% solids were introduced to a reactor vessel. Normally, the thickener underflows will contain in the range of 30 to 35% solids. However, it is desirable from an economic standpoint to operate with as high a percentage of solids as possible. The resultant mixture was agitated for 15 minutes at a temperature of about 140° F. Air was bubbled through the mixture for a time sufficient to oxidize 5% of the ferrous ions to the ferric state. A pH value between 7 and 8, measured by a Beckmann pH meter, indicated neutralization was complete. The resultant slurry, containing 35% solids, was then separated by means of a vacuum filter. The filtrate was substantially free of solids and contained, in comparison with the total quantity of sulfate in the waste pickle liquor started with, a relatively small amount of sulfate ion and a much lessened proportion of water-hardening anions; it could be disposed of in a river or stream while maintaining substantial compliance with stream-pollution laws and regulations. The cake resulting from the filtration contained 38% moisture and was sent to a mixing vessel, wherein dry blast-furnace flue dust was introduced. The sinter-plant feed thus produced contained 21% moisture and 1.3% sulfur. All of the moisture and at least 80% of the sulfur is driven off in the sintering operation.

*Table II* [1]

|  | Pickle liquor | Thickner underflow | Hydrated lime | Neutral slurry | Filter cake | Filtrate | Dry dust | Sinter plant feed |
|---|---|---|---|---|---|---|---|---|
| Flow rate (g.p.m.) | 8.8 | 15.3 | 2.8 | 27.6 |  | 16.0 |  |  |
| Specific gravity | 1.22 | 1.54 | 1.12 | 1.35 |  | 1.0 |  |  |
| Liquid (lb./day) | 128,500 | 155,000 | 29,800 | 289,280 | 97,030 | 192,250 |  | 97,030 |
| Solid (lb./day) |  | 127,000 | 7,450 | 158,470 | 158,470 |  | 209,000 | 367,470 |
| Total (lb./day) | 128,500 | 282,000 | 37,250 | 447,740 | 255,400 | 192,250 | 209,000 | 464,500 |

[1] These flow data have been extrapolated from a test run on bench scale equipment and purports to be that for a mill of typical size.

Flow data for the foregoing test run are given in Table II.

In the specification and claim hereof, the terms "basic sulfate" and "alkaline-earth sulfate" are considered synonymous.

Although the present invention has been described with respect to certain specific embodiments, it will be readily apparent to those skilled in the art that various modifications in procedure may be made to suit specific requirements without departing from the spirit and scope of the invention.

I claim:

A process for neutralizing acidic sulfate, iron value-containing waste pickle liquor with a basic, iron-value-containing blast-furnace flue dust, comprising: subjecting a dust-laden blast-furnace-effluent gas to a particle-classification and -separation operation to remove from said gas a first, relatively coarser and chemically relatively inactive dust fraction, then removing from said effluent gas a second relatively finer and chemically relatively active dust fraction by means inclusive of a water-scrubbing operation to form an aqueous dispersion of said second dust fraction, concentrating said aqueous dispersion to form a slurry having a relatively greater neutralizing capacity as compared to a slurry containing an equal quantity of unclassified dust, mixing said slurry with the waste pickle liquor maintained at a temperature of from 100 to 160° F., to neutralize the acid values therein, thereby forming a precipitate comprising recoverable iron values and basic sulfates, separating the precipitate, and sintering the same to produce a basic, low-sulfur, reducible, iron value-containing blast-furnace-feed product.

References Cited by the Examiner

UNITED STATES PATENTS

| 1,879,373 | 9/32 | McComb | 75—25 |
| 2,277,663 | 3/42 | Francis et al. | 75—25 |
| 2,746,920 | 5/56 | Wunderly. | |
| 2,810,633 | 10/57 | Cooper | 75—5 |

BENJAMIN HENKIN, *Primary Examiner.*